United States Patent [19]

Tholen

[11] 4,371,112
[45] Feb. 1, 1983

[54] AUXILIARY AIR HEATER

[75] Inventor: Paul Tholen, Gladbach, Fed. Rep. of Germany

[73] Assignee: Klockner-Humboldt-Deutz AG, Cologne, Fed. Rep. of Germany

[21] Appl. No.: 233,573

[22] Filed: Feb. 11, 1981

[30] Foreign Application Priority Data

Feb. 16, 1980 [DE] Fed. Rep. of Germany ....... 3005966

[51] Int. Cl.³ .......................................... B60N 27/00
[52] U.S. Cl. ................. 237/12.3 A; 122/26; 126/247; 237/1 R
[58] Field of Search ................. 122/26, 247; 237/12.3 A, 12.3 C, 55, 1 R

[56] References Cited

U.S. PATENT DOCUMENTS 3,777,975 12/1973 Kofink ........................... 237/12.3 A
3,779,307 12/1973 Weiss et al. ..................... 237/12.3 B
4,192,456 3/1980 Shields et al. .................. 237/12.3 R

FOREIGN PATENT DOCUMENTS 2628697 1/1977 Fed. Rep. of Germany ........ 122/26
757354 8/1980 U.S.S.R. ................................. 122/26

Primary Examiner—William R. Cline
Assistant Examiner—John F. McNally
Attorney, Agent, or Firm—Watson, Cole, Grindle & Watson

[57] ABSTRACT

An auxiliary heating apparatus is used in conjunction with a primary heater system which includes a heat exchange for heating air by indirect heat exchange with a fluid stream containing engine heat. The auxiliary heater apparatus comprises a fluid pump, a throttle valve for reducing the pressure of and thereby heating the auxiliary heating fluid, and an air heat exchanger arranged in series with the primary heat exchanger on the air side.

8 Claims, 4 Drawing Figures

AUXILIARY AIR HEATER

BACKGROUND OF THE INVENTION

1. Field of the Invention:

The present invention relates to an apparatus for heating air using a heat exchanger heated by waste heat of an engine, preferably a vehicular internal combustion engine.

2. Background of the Invention

Apparatuses are known for heating a vehicle operator's cabin utilizing the heated lubricating oil of an internal combustion engine fed to a heat exchanger in the operator's cabin. Such devices are described, for example, in U.S. Pat. No. 4,136,824, commonly owned herewith. Such heating systems are fully operational at the normal operating temperatures of the engine. However, such heaters offer heat slowly during warm-up periods and generally operate inadequately during no-load periods. Particularly during operating conditions which, for instance, are characteristic of intercity traffic, heat consumption necessary to accommodate the rapid and, in some cases, repetitive heating of the cabin and for defrosting window panes is quite high.

SUMMARY OF THE INVENTION

Therefore, it is an object of the invention to provide a heating apparatus which retains the devices that have proved successful for continuous running under normal service conditions and which provides for operating periods that heretofore have not been adequately provided for and for other complicated service conditions. Thus, the invention provides a totally or largely independent auxiliary heating apparatus which increases, by a sufficient amount, the quantity of heat already available.

According to the invention, the above-identified problems are solved by providing, in combination with a primary heat exchanger for heating air by indirect heat exchange using a main heating fluid stream that is heated by engine heat, an auxiliary heating system comprising a fluid pump for pumping an auxiliary stream of heating fluid, a pressure-reducing element hydraulically connected on the discharge side of the pump for converting the pressure of the auxiliary fluid into heat for increasing the temperature of the same, and an auxiliary heat exchanger hydraulically connected downstream from said element for further heating, by indirect heat exchange with the heated auxiliary fluid, air heated by said primary heater.

Preferably the heat exchangers are connected in series relative to the flow of air therethrough with said auxiliary heat exchanger arranged downstream from said primary heat exchanger. And the exchangers may preferably be combined in a single structure with the heating fluid sides thereof arranged in parallel relationship. Even more preferably, the fluid sides of the exchangers may be arranged for counter-current flow.

In one form of the invention the primary heat exchanger is arranged and adapted to accommodate engine cooling water as said main heating fluid and the various components of the auxiliary heating apparatus are arranged and adapted to accommodate engine lubricating oil as the auxiliary heating fluid. In another form of the invention, said auxiliary system comprises a closed circuit hydraulic system and includes a source for said auxiliary fluid that is separate from the fluid systems of said engine. And in yet another form, said apparatus includes a common source for said main fluid stream and said auxiliary fluid stream. One-way check valve means may be provided for interconnecting said systems upstream from said exchangers and permitting flow only from the primary system and into the auxiliary system. The systems may also include valve means for controlling fluid flow in said primary system.

In a particularly preferred form of the invention, the apparatus includes adjustable flow apportionment means in said auxiliary system for selectively dividing the fluid flow downstream from said pressure reducing element into a shunt stream and a sump return stream and diverting said shunt stream into the pump suction. The apportionment means preferably is located downstream from said auxiliary heat exchanger. Controllable by-pass valve means may be provided for said pressure-reducing element and regulating by-pass valve means may be provided for said auxiliary heat exchanger.

DETAILED DESCRIPTION OF THE INVENTION

Figure 1:
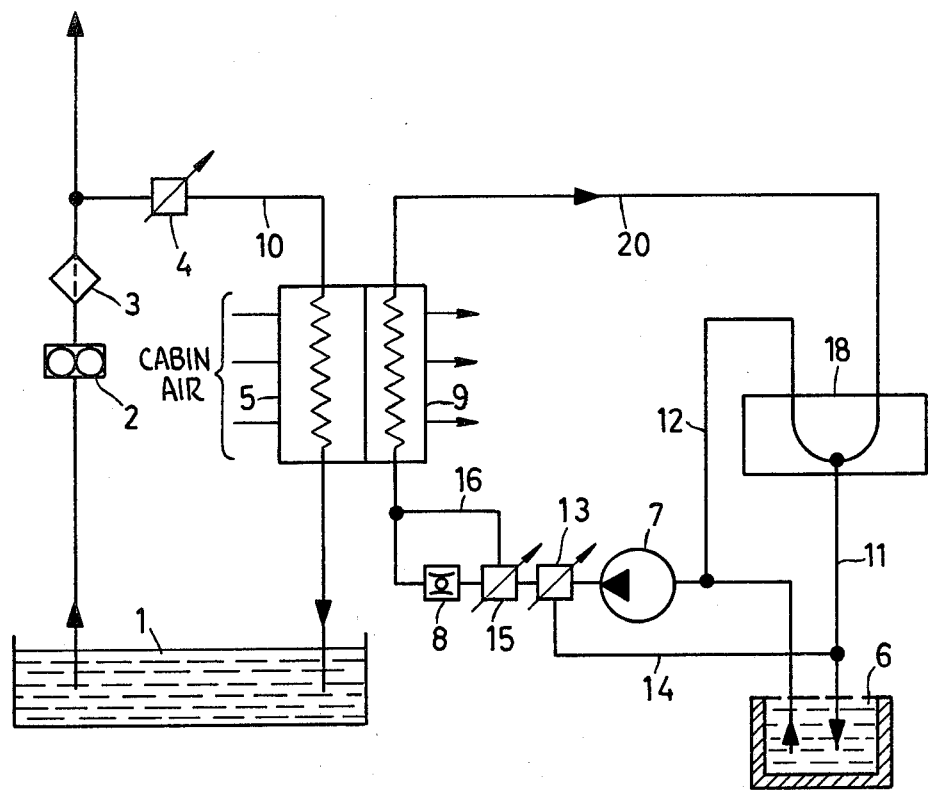
FIG. 1 schematically illustrates a main and an auxiliary heating circuit with separate heating-medium systems constructed in accordance with the invention.

In FIG. 1 is shown a main heating circuit 10 having a liquid collector or sump 1 filled with a heating medium which absorbs heat developed in an engine at some point in the circuit. The heating medium is supplied by a pump 2 of suitable construction through filter 3 to a main air heat exchanger 5 and is then returned to liquid collector 1. Downstream from filter 3, main heating circuit 10 branches off and, following a course not shown herein that is parallel to main heat exchanger 5, leads to other assemblies of the engine concerned and returns to liquid collector 1. Depending on the type of circuit, these other assemblies may be water chambers of an engine to be cooled, hydraulic-oil consuming devices, lubricating points, etc. The rate of flow to main heat exchanger 5 may be adjusted or controlled with a throttle valve 4. Main heating circuit 10 may alternatively be designed without branches and with series arrangement of all assemblies including main heat exchanger 5.

Auxiliary heating circuit 20 in FIG. 1 likewise includes a liquid collector or sump 6 filled with a pressure-resistant heating medium which is delivered by a hydraulic pump 7 via a pressure-reducing element, such as a throttle valve 8, to auxiliary fluid air heat exchanger 9, the air side of which is combined preferably in series arrangement on the downstream side of main heat exchanger 5. Thus, the flow of air through exchangers 5 and 9 is as illustrated by the arrows in FIG. 1. Auxiliary heating circuit 20 branches off and has various control devices. Downstream from auxiliary heat exchanger 9 is an adjustable flow apportioner means 18 which controls, e.g., as a function of time or, preferably, of the temperature or the viscosity of the fluid, the rates of flow in a return pipe 11 to liquid collector 6 and in a short-circuit line 12 which leads to the suction side of hydraulic pump 7. For controlling the rate of flow to auxiliary heat exchanger 9, while hydraulic pump 7 is being driven continuously, there is placed, on the pump discharge side, a directional-control valve 13 which regulates a diverting conduit 14 connected to liquid collector 6. When the heat supply in the auxiliary heating circuit is adequate, a by-pass pipe 16 parallel to pressure-reducing element 8 may be opened via a control element 15.

Figure 2:
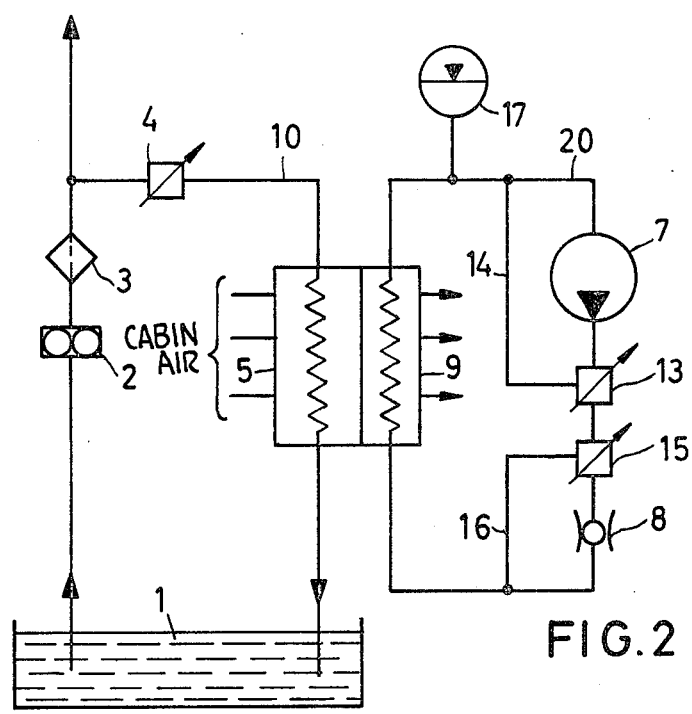
FIG. 2 illustrates an open main heating circuit and a self-contained sealed-in auxiliary heating circuit.

FIG. 2 illustrates an arrangement where main heating circuit 10 is designed in the same way as in FIG. 1. However, auxiliary circuit 20 is self-contained and includes, instead of a liquid collector, an expansion tank 17 for regulating the charge level. For control and regulation, a directional-control valve 13 with its conduit 14 and control element 15 with its by-pass pipe 16 may be provided.

Figure 3:
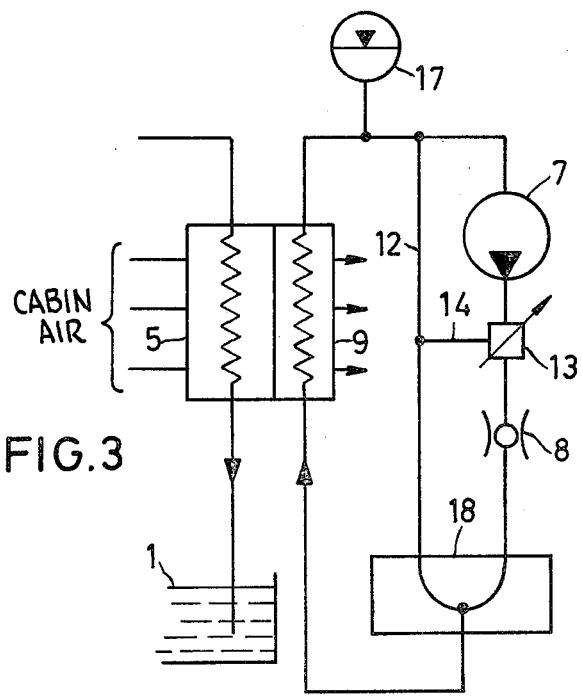
FIG. 3 illustrates a special design of a self-contained sealed-in auxiliary heating circuit.

FIG. 3 illustrates a preferred embodiment of the auxiliary heating circuit 20 of FIG. 2 wherein directional-control valve or flow apportionment means 18 is provided between pressure-reducing element 8 and auxiliary heat exchanger 9. Valve 18 diverts, via short-circuit line 12, until adequate heating is obtained, a quantity of heating medium which may rapidly become warm. A directional-control valve 13 and a conduit 14 for limiting the production of heat are also included.

Figure 4:
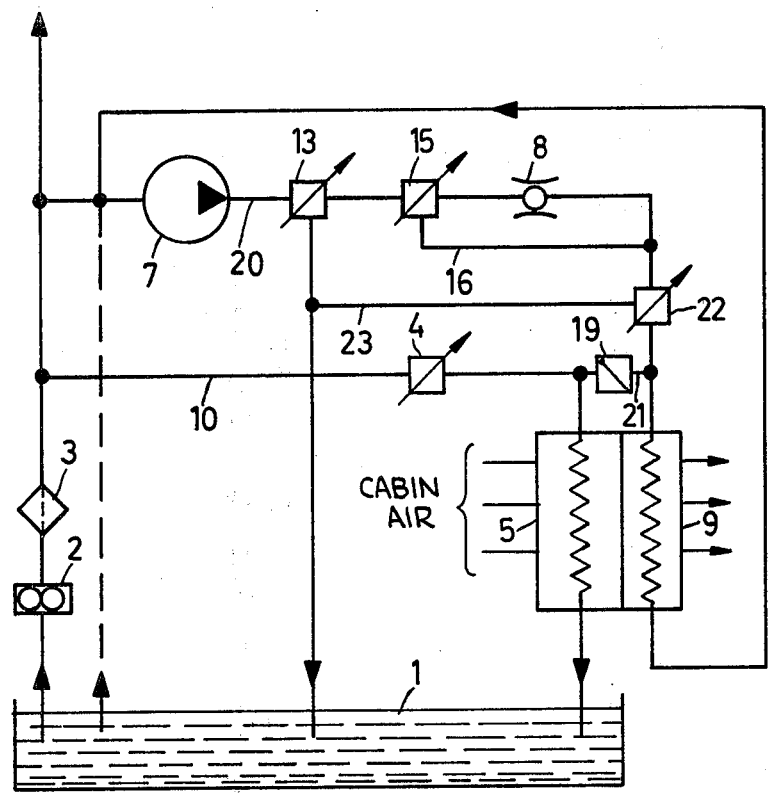
FIG. 4 illustrates a main and an auxiliary heating circuit with a common heating-medium system.

FIG. 4 illustrates a system which includes a connection 21 between main heating circuit 10 and auxiliary heating circuit 20 for operation using the same heating medium from a common liquid sump 1. A non-return flap or a check valve 19 is provided in connecting pipe 21. As shown in FIG. 4, hydraulic pump 7 draws fluid from liquid collector 1 or from the main heating circuit downstream from pump 2 and filter 3. A second directional-control valve 22 in auxiliary heating circuit 20 is provided downstream from pressure-reducing element 8 and is connected to diverting conduit 14 through conduit 23. This arrangement offers the possibility of increasing the heat of the heating medium in pressure-reducing element 8 without direct pressure-loading of auxiliary heat exchanger 9.

The present invention thus provides an apparatus which uses a liquid heating medium, is easy to service and simple to install, is preferably driven by the existing engine, and makes available, in an auxiliary heat exchanger, the extra amount of heat required during abnormal operating conditions solely by increasing the pressure in the hydraulic pump with the resultant production of heat in the pressure-reducing element.

The apparatus provided by the invention offers the advantages that proven heating apparatuses with existing air ducts, adjusting devices, etc. need not be modified and that the auxiliary apparatus need be designed only for basic or peak loads. Thus, the auxiliary heating circuit may be mounted completely independently, in conjunction with the existing facilities, particularly with regard to the connection of the hydraulic pump to a suitable drive and the mounting of the auxiliary heat exchanger in accordance with the available space conditions. The auxiliary devices may have very small dimensions and, with the exception of the heat exchanger, they can advantageously be combined into a prepackaged component which can easily be fitted to an existing engine. A combination of the auxiliary heating circuit is possible, not only with a main heating circuit in which engine lubricating oil serves as heating medium, but also with devices in which cooling water or hydraulic oil, absorbs the waste heat of an engine or the frictional heat from working mechanisms.

In a preferred embodiment of the invention, the air side of the auxiliary heat exchanger 9 is connected in series arrangement with the air side of the main heat exchanger 5 and is mounted preferably behind the main heat exchanger. Manifestly the conventional primary heating air ducts, control flaps and blowers may remain unchanged.

The utility of the novel arrangement provided by the invention is based on the fact that auxiliary heating circuit 20 heats more rapidly and operates at a higher temperature level while the heat of the main heating circuit 10 provides a gradual preheating of the heating air as the temperature rises slowly. Maintenance is considerably simplified because auxiliary heating circuit 20 as provided by the invention may be self-contained and sealed-in as shown in FIGS. 2 and 3. Furthermore, evaporation during pressure-reduction in auxiliary heating circuit 20 may be avoided simply by increasing the pressure level. The invention offers various solutions for the choice of heating mediums for the two circuits. In a water-cooled internal combustion engine it may be desirable to connect main heating circuit 10 to the cooling-water system and auxiliary heating circuit 20 to the lubricating-oil system. Manifestly the greatest part of usable waste heat is available in the cooling water, and the lubricating-oil provides a heating medium suitable for temperature build-up by pressure increase and throttling. Another advantage is that lubricating oil may be heated more rapidly and when the engine is hot, a further portion of the waste heat is available therein. If the vehicle includes a hydraulic system, auxiliary heating circuit 20 may be connected thereto since hydraulic oil is particularly suitable for the pressure increase required.

To simplify the apparatus, the main and auxiliary heating circuits may preferably be connected, as shown in FIG. 4, to a common liquid sump or collector 10. In systems using an internal combustion engine, the oil pan is particularly suitable. To increase the effectiveness of such system, a connecting line 21 provided between the circuits may be equipped with a check valve 19 normally blocking the flow from the auxiliary circuit. When there is an adequate supply of heat in main heating circuit 10, hydraulic pump 7 may be stopped, and auxiliary heat exchanger 9 is then included in the main heating circuit via connecting line 21 and valve 19. In this way, the effective surface of the heat exchanger 5, 9 in the circuit is enlarged and the heating effect is enhanced.

The suitable rapid increase of temperature in the auxiliary heating circuit can be substantially impaired when the liquid collector 6 contains a large amount of heating medium which at first absorbs a considerable amount of the heat produced in the pressure-reduction element. When this occurs, by means of a flow apportioner 18 in the auxiliary heating circuit 20, one may cause the heating fluid to be totally or partly returned and reheated, as a function of temperature or time, by by-passing liquid collector 6. Flow apportioner 18 may be mounted downstream from auxiliary heat exchanger 9 or alternatively upstream from heat exchanger 9. In either case, the system operates to increase the temperature substantially prior to the first pressure-loading of the fluid. A suitable flow apportioning circuit is fully disclosed in commonly assigned, co-pending U.S. application Ser. No. 225,610 filed Jan. 16, 1981.

I claim:

1. An arrangement for heating the operator's cabin of a motor vehicle, comprising a liquid circulation system of the vehicle including a liquid medium for cooling or lubricating the engine, means for circulating the liquid medium through the circulation system, a main heating circuit in said circulation system including a main heat exchanger for heating air by indirect heat exchange with the liquid medium that is heated by engine heat generated by the engine, valve means in said circulation system for controlling the rate of liquid medium flow to the engine for cooling or lubricating or to said main heat exchanger for heating the air, whereby to assure an adequate quantity of liquid flow required for said circulation system and to make available a sufficient quantity of liquid flow through said main heating circuit for heating purposes, an auxiliary heating circuit containing an auxiliary stream of liquid medium and having a hydraulic pump for delivering the auxiliary stream through the auxiliary circuit via a pressure-reducing element to an auxiliary heat exchanger, the pressure of the auxiliary stream through said element being converted into heat for increasing the temperature of same, said heat exchangers being connected in series relative to the flow of air therethrough with said auxiliary heat exchanger being arranged on the downstream side of said main heat exchanger.

2. The arrangement according to claim 1, further comprising one-way check valve means interconnecting said main and auxiliary heating circuits for normally blocking the flow of liquid medium from said auxiliary circuit and facilitating flow of liquid medium through both said heat exchangers, whereby operation of said hydraulic pump may optionally be stopped upon an adequate supply of heat in said main circuit, and said auxiliary heat exchanger is then included in said main heating circuit via said check valve means for enhancing the heating effect of said heat exchangers as combined.

3. The arrangement according to claim 1 or 2, wherein said heat exchangers are combined into a single structure with the liquid medium sides thereof being arranged in parallel relationship.

4. The arrangement according to claim 1 or 2, wherein a sump is provided as a common source for said liquid medium of said main and auxiliary circuits.

5. The arrangement according to claim 1, wherein said main heat exchanger is arranged and adapted to accommodate engine cooling water as said liquid medium of said circulation system, and said auxiliary heat exchanger is arranged and adapted to accommodate engine lubricating oil as said liquid medium of said auxiliary circuit.

6. The arrangement according to claim 1, wherein said auxiliary system comprises a closed circuit hydraulic system and includes a source for said liquid medium thereof that is separate from said liquid circulation system.

7. The arrangement according to claim 1, wherein adjustable flow apportionment means is provided in said auxiliary system for selectively dividing the liquid flow downstream from said pressure-reducing element into a shunt stream and a return stream and diverting said shunt stream into the pump suction.

8. The arrangement according to claim 7, wherein said apportionment means is located downstream of said auxiliary heat exchanger.

* * * * *